Oct. 28, 1941.   F. D. PINOTTI   2,261,074
TOOL FOR SHAPING GLASS VIALS
Filed May 6, 1938
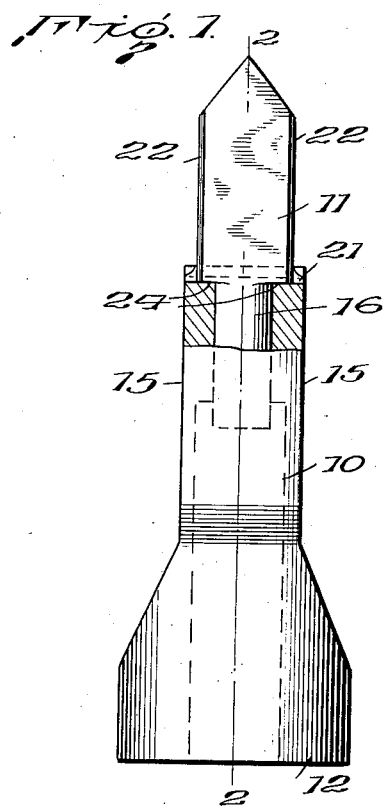
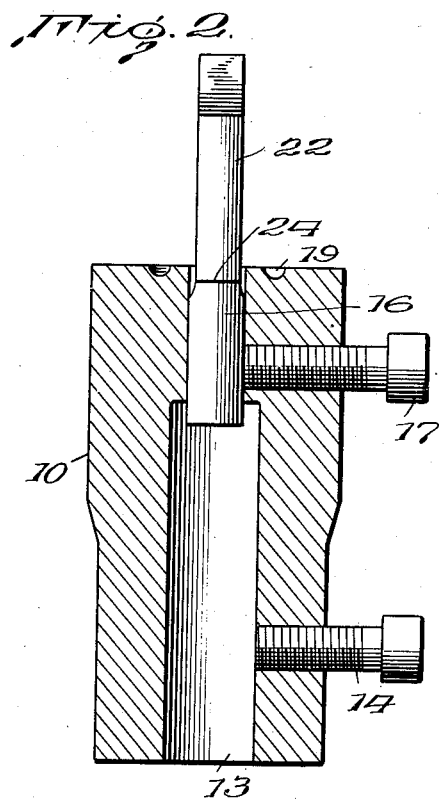
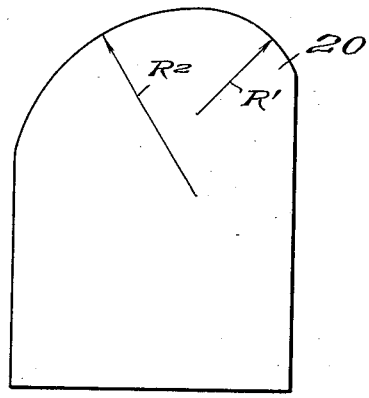
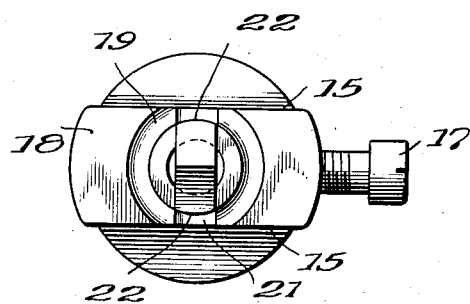
Inventor
Fred D. Pinotti,
By Charles B. Belknap
Attorney Patented Oct. 28, 1941

2,261,074

UNITED STATES PATENT OFFICE 2,261,074

TOOL FOR SHAPING GLASS VIALS

Fred D. Pinotti, Landis Township, Cumberland County, N. J., assignor to Kimble Glass Company, Vineland, N. J., a corporation of Illinois Application May 6, 1938, Serial No. 206,471

3 Claims. (Cl. 49—24)

The present invention relates to tools for shaping the necks and mouths of glass vials. More particularly, the invention pertains to a combined mouth forming mandrel and lip shaper designed to finish the interior surface of the vial neck and to round the end thereof.

It has been found that when the end of a vial neck is finished with a square or sharp-edged lip, the subsequent handling of the vial frequently results in chippage of the glass at the mouth of the vial. Efforts have been made to devise tools designed to round these edges simultaneously with the operation which finishes the interior surface of the neck, but usually these tools consisted of a combined one-piece mandrel and end shaper. When portions of these one-piece tools became worn, it was necessary to scrap the whole tool. Two-piece tools, that is those in which the mandrel and shaper are separable, have heretofore been made by expensive machining operations to produce accurate results, or have been so assembled that double tooling of the plastic glass has resulted, frequently producing rough edges at the end or sides of the vial neck.

These difficulties are overcome by the present invention, one of the objects of which is to provide an inexpensive two-piece tool, yet one which gives accurate results.

Another object of the invention is to provide a tool which forms the mouth and finishes the interior surface of the neck in addition to rounding the lip at the end thereof in one operation.

Other objects will be apparent from the following description taken in connection with the accompanying drawing, in which Fig. 1 is a front elevation, partly in section, of the assembled tool;

Fig. 2 is a section taken on line 2—2 of Fig. 1;

Fig. 3 is a top plan view of the tool; and

Fig. 4 is an enlarged front elevation of a lathe tool designed to cut a groove in the lip shaping tool.

In the drawing, the tool comprises a body 10 having a lip shaping surface in the end face thereof and a separable mandrel 11 for forming the mouth and finishing the interior wall of the vial neck. The body 10 of the tool is shown as being substantially cylindrical at one end 12 and provided at this end with a bore 13 to receive a part of a tool advancing mechanism which is not shown but which may be any of the known devices employed on machines for fabricating vials.

A set screw 14 holds the tool body in fixed relation to the advancing mechanism. The other end of the body is reduced and has flat sides 15. This end is also bored to receive the shank 16 of mandrel 11, the latter being designed to shape the mouth and smooth the interior surface of the vial neck. The mandrel is separable from the body and is held in place therein by set screw 17.

Referring to Fig. 3, it will be seen that in the end face 18 of the body there is cut an annular groove 19, the cross section of which corresponds to the shape of the lathe tool 20 illustrated in Fig. 4. The profile of the end of tool 20 is comprised of two arcs $R'$, $R^2$, the radius of arc $R^2$ being approximately twice that of the arc $R'$. In the groove cut by this tool, the smaller of the arcs $R'$ is the one nearer the axis of the body. The arcs meet at the top of the lip and are tangent to a plane to which the axis of the body is perpendicular. A groove having these characteristics will shape the mouth end of a vial to produce an annular rounded lip but one which has the appearance of flatness. The chippage in vials shaped by the grooved tool illustrated has been found in extensive tests to be greatly reduced.

Extending across the top face of the body is a straight channel 21 which interrupts the continuity of the groove and the center line of which coincides with the diameter of groove 19. The lip shaping tool is thus made up of two spaced arcuate grooves. The width of the channel is substantially that of the thickness of mandrel 11 and its depth is somewhat greater than that of groove 19. As shown in the several views, the axis of the mandrel coincides with that of groove 19. This mandrel comprises two diametrically opposite arcuate shaping surfaces 22, the radius of each arc being that of the inner side of groove 19, so that in the finished product the inner wall of the neck is substantially tangent to and a continuation of the rounded lip. The arcuate surfaces of the mandrel extend below the bottom of the groove however, the shoulders 24 on the mandrel resting on the bottom of channel 21. In effect, the mandrel constitutes a section of the surface of a cylinder, the diameter of which is the smaller diameter of groove 19. The mandrel is flattened as shown, that is, its width is substantially greater than its thickness, to provide for limited engagement thereof with the glass so that the glass is not chilled quickly as is the case when a round or cylindrical tool provides for full circumferential engagement thereof with the interior of the neck.

In a tool such as that described, the objections present in prior tools of this type are eliminated. Extreme accuracy in cutting the groove and mandrel is not essential, since the mandrel and groove do not simultaneously engage the glass. Rather the interior finishing and lip rounding are alternate operations. Hence, there may be slight differences in the diameters of the finishing mandrel and the inner surface of the lipping groove. Interchangeability of the mandrel and lipping tools is thus possible without increased expense.

Furthermore, in prior constructions wherein the mandrel merged into the groove, there was considerable wear on the mandrel at the line of merger. The provision of a channel which interrupts the continuity of the groove and permits seating of the mandrel in a plane below the groove, removes the shoulder or end of the mandrel, which is the portion usually subject to wear, from the finishing operation. This arrangement, together with the separation of the interior finishing and lipping operations, practically eliminates wear on the mandrel. It will be seen, therefore, that the joint at the merger of the mandrel finishing surfaces and that of the lipping groove, instead of being at a right angle to the axis of the tool as in prior constructions, is parallel with the axis. The former type of joint was subject to much wear, whereas the present arrangement eliminates such a joint. In addition, close fitting of parts, the accuracy of which is often destroyed when subjected to heat, is unnecessary in the present tool.

It is to be understood that the form of the invention illustrated herein is a preferred embodiment thereof and is not to be construed as limiting the invention to the exact details shown. The tools and dimensions thereof, for instance, are to be somewhat modified for different sizes and shapes of vials.

What I claim as my invention is:

1. A tool for shaping glass vials comprising a body member having spaced arcuate lip shaping grooves in the end face thereof, and a mandrel removably supported by said body, said mandrel having arcuate mouth finishing surfaces disposed between said spaced grooves, said mouth finishing surfaces being so positioned circumferentially with respect to said grooves that the finishing surfaces are disposed only in the space between said grooves and have a width substantially equal to the space between the grooves the radii of said mouth finishing surfaces being substantially equal to the radii of the inner walls of said grooves.

2. A tool for shaping glass vials comprising a body member having spaced arcuate lip shaping grooves in the end face thereof, and a mandrel removably supported by said body, said mandrel having arcuate mouth finishing surfaces disposed between said spaced grooves, said finishing surfaces each having a width substantially equal to the space between the grooves, the radii of said mouth finishing surfaces being substantially equal to the radii of the inner walls of said grooves, the inner terminal surface of the lip shaping grooves being substantially parallel to the axis of the tool, the mouth finishing surfaces likewise being substantially parallel to the axis of the tool.

3. A tool for shaping glass vials comprising a body member having an interrupted annular groove for forming a lip on the vial, and a transverse channel, said groove and said channel being in the end face of said body member, the depth of said groove being less than that of said channel, and a mandrel removably supported in said body, said mandrel having a mouth finishing surface the width of which is substantially that of the space defining the interruption of said groove, said finishing surface extending into said channel.

FRED D. PINOTTI.